(12) United States Patent
Chen et al.

(10) Patent No.: US 8,391,726 B2
(45) Date of Patent: Mar. 5, 2013

(54) METHOD AND APPARATUS FOR FRAME DETECTION AND POLARIZATION SEPARATION

(75) Inventors: Yuanjie Chen, Saratoga, CA (US); Zhuhong Zhang, Ottawa (CA); Chuandong Li, Ottawa (CA); Fei Zhu, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 371 days.

(21) Appl. No.: 12/712,655

(22) Filed: Feb. 25, 2010

(65) Prior Publication Data

US 2011/0206385 A1   Aug. 25, 2011

(51) Int. Cl.
*H04B 10/06* (2006.01)
*H04B 10/00* (2006.01)
*H04L 27/28* (2006.01)
*H04L 12/66* (2006.01)

(52) U.S. Cl. ........ 398/208; 398/202; 398/154; 398/140; 398/152; 375/344; 375/259; 375/267

(58) Field of Classification Search .................. 398/152, 398/140, 208, 202
See application file for complete search history.

(56) References Cited

U.S. PATENT DOCUMENTS

| | | | |
|---|---|---|---|
| 6,751,190 B1 | 6/2004 | Swallow | |
| 7,345,991 B1 | 3/2008 | Shabtay et al. | |
| 7,509,054 B2 | 3/2009 | Calabro et al. | |
| 7,522,841 B2 * | 4/2009 | Bontu et al. | 398/154 |
| 7,555,227 B2 | 6/2009 | Bontu et al. | |
| 7,747,169 B2 | 6/2010 | Koc | |
| 2003/0117952 A1 | 6/2003 | Ueno et al. | |
| 2003/0123446 A1 | 7/2003 | Muirhead et al. | |
| 2006/0268682 A1 | 11/2006 | Vasseur | |
| 2007/0047556 A1 | 3/2007 | Raahemi et al. | |
| 2007/0165515 A1 | 7/2007 | Vasseur | |
| 2009/0060101 A1 * | 3/2009 | Liu | 375/344 |
| 2009/0103921 A1 | 4/2009 | Frankel | |
| 2009/0202243 A1 | 8/2009 | Qian et al. | |
| 2011/0033184 A1 | 2/2011 | Zhang et al. | |

FOREIGN PATENT DOCUMENTS

| | | |
|---|---|---|
| CN | 1682472 A | 10/2005 |
| CN | 101414882 A | 4/2009 |
| CN | 101573900 A | 11/2009 |
| WO | 2009076316 A2 | 6/2009 |

OTHER PUBLICATIONS

Tseytlin, "Digital, Endless Polarization Control for Polarization Multiplexed Fiber-Optic Communications," MFC 83, OFC 2003, vol. 1, pp. 103.

(Continued)

*Primary Examiner* — Shi K Li
*Assistant Examiner* — Oommen Jacob
(74) *Attorney, Agent, or Firm* — Conley Rose, P.C.; Grant Rodolph; Clint Wilkins

(57) ABSTRACT

An optical receiver comprising a frame detector configured to receive a polarized signal comprising a first bit stream and a second bit stream, and further configured to identify a plurality of frames in the first bit stream and the second bit stream using a composite header, and a time-domain equalizer (TDEQ) configured to separate the first bit stream and the second bit stream using a portion of the composite header.

19 Claims, 14 Drawing Sheets

OTHER PUBLICATIONS

Kazovsky, "Phase- and Polarization-Diversity Coherent Optical Techniques," J. of Lightwave Technology, vol. 7, No. 2, 1989, pp. 279-292.

Pan, P., Ed., et al., "Fast Reroute Extensions to RSVP-TE for LSP Tunnels," RFC 4090, May 2005, 38 pages.

Tseytlin, M., et al., "Digital, Endless Polarization Control for Polarization Multiplexed Fiber-Optic Communications," Optical Fiber Communications Conference 2003, OFC 2003, Presentation, Mar. 23-28, 2003,CeLight, 14 pages.

Foreign Communication From a Related Counterpart Application, PCT Application PCT/US2010/020462, International Search Report dated Apr. 8, 2010, 4 pages.

Foreign Communication From a Related Counterpart Application, PCT Application PCT/US2010/020462, Written Opinion dated Apr. 8, 2010, 4 pages.

Foreign Communication From a Related Counterpart Application, PCT Application PCT/CN2011/070968, International Search Report dated May 19, 2011, 5 pages.

Foreign Communication From a Related Counterpart Application, PCT Application PCT/CN2011/070968, Written Opinion dated May 19, 2011, 7 pages.

Zhang, Z., et al.; "Side Band Signaling in Polarization Multiplexed Coherent Optical Communications," U.S. Appl. No. 61/232,321, filed Aug. 7, 2009, Specification 13 pages.

\* cited by examiner

METHOD AND APPARATUS FOR FRAME DETECTION AND POLARIZATION SEPARATION

CROSS-REFERENCE TO RELATED APPLICATIONS

Not Applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current optical communication systems may be classified into two detection types: direct detection and coherent detection. In a direct detection system, data may be modulated using either the magnitude or the phase of the optical signal. In a coherent detection system, data may be modulated using both the magnitude and the phase of the signal, thus allowing greater data transmission rates. As the demand for higher transmission rates increases, data streams may also be modulated using multiple polarizations of optical signals. However, as the optical signals pass through optical links, they may be subject to distortion caused by chromatic dispersion, polarization dependent impairment, noise, and other factors. Such distortion may affect the reception of the polarized optical signals and may increase the difficulty in distinguishing between the different polarized optical signals.

SUMMARY

In one embodiment, the disclosure includes an optical receiver comprising a frame detector configured to receive a polarized signal comprising a first bit stream and a second bit stream, and further configured to identify a plurality of frames in the first bit stream and the second bit stream using a composite header, and a time-domain equalizer (TDEQ) configured to separate the first bit stream and the second bit stream using a portion of the composite header.

In another embodiment, the disclosure includes an optical network component comprising, at least one processor configured to implement a method comprising receiving a signal comprising a first polarized optical signal and a second polarized optical signal, obtaining a post-amble, a pre-amble, and a header from the signal, detecting a first frame in the first polarized optical signal and a second frame in the second polarized optical signal using the post-amble, the pre-amble, and the header, and separating the first frame from the second frame using the header.

In yet another embodiment, the disclosure includes a method comprising selecting a first bit sequence for a first header and a second bit sequence for a second header, wherein the first header and the second header are distinguished using a cross-correlation function of the first bit sequence and the second bit sequence, selecting a third bit sequence for a first pre-amble and a fourth bit sequence for a first post-amble, wherein the first post-amble, the first pre-amble, and the first header are detected using an auto-correlation function of the first bit sequence, the third bit sequence, and the fourth bit sequence, and selecting a fifth bit sequence for a second pre-amble and a sixth bit sequence for a second post-amble, wherein the second post-amble, the second pre-amble, and the second header are detectable using an auto-correlation function of the second bit sequence, the fifth bit sequence, and the sixth bit sequence.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for frame detection and polarization separation for polarized signals. The frame detection may be accomplished using a composite header in the signals, which may have a desirable auto-correlation property. The polarization separation may be accomplished using a portion of a first composite header for the first polarized signal and a portion of a second composite header for the second polarized signal. The first composite header may comprise a first post-amble (e.g. from a first previous frame), and a first pre-amble and a first header (e.g. from a first subsequent frame). Similarly, the second composite header may comprise a second post-amble (e.g. from a second previous frame), and a second pre-amble and a second header (e.g. from a second subsequent frame). The first header and the second header may comprise different bit sequences, which may have a substantially distinguishable and detectable cross-correlation function that allows polarization separation to be achieved. Additionally, the post-amble, pre-amble, and header for each polarized signal may comprise bit sequences that may have a substantially distinguishable and detectable auto-correlation function that allows frame detection to be achieved. To enable frame detection and polarization separation, the frames may be transmitted without overlapping each other, e.g. in time.

Figure 1:
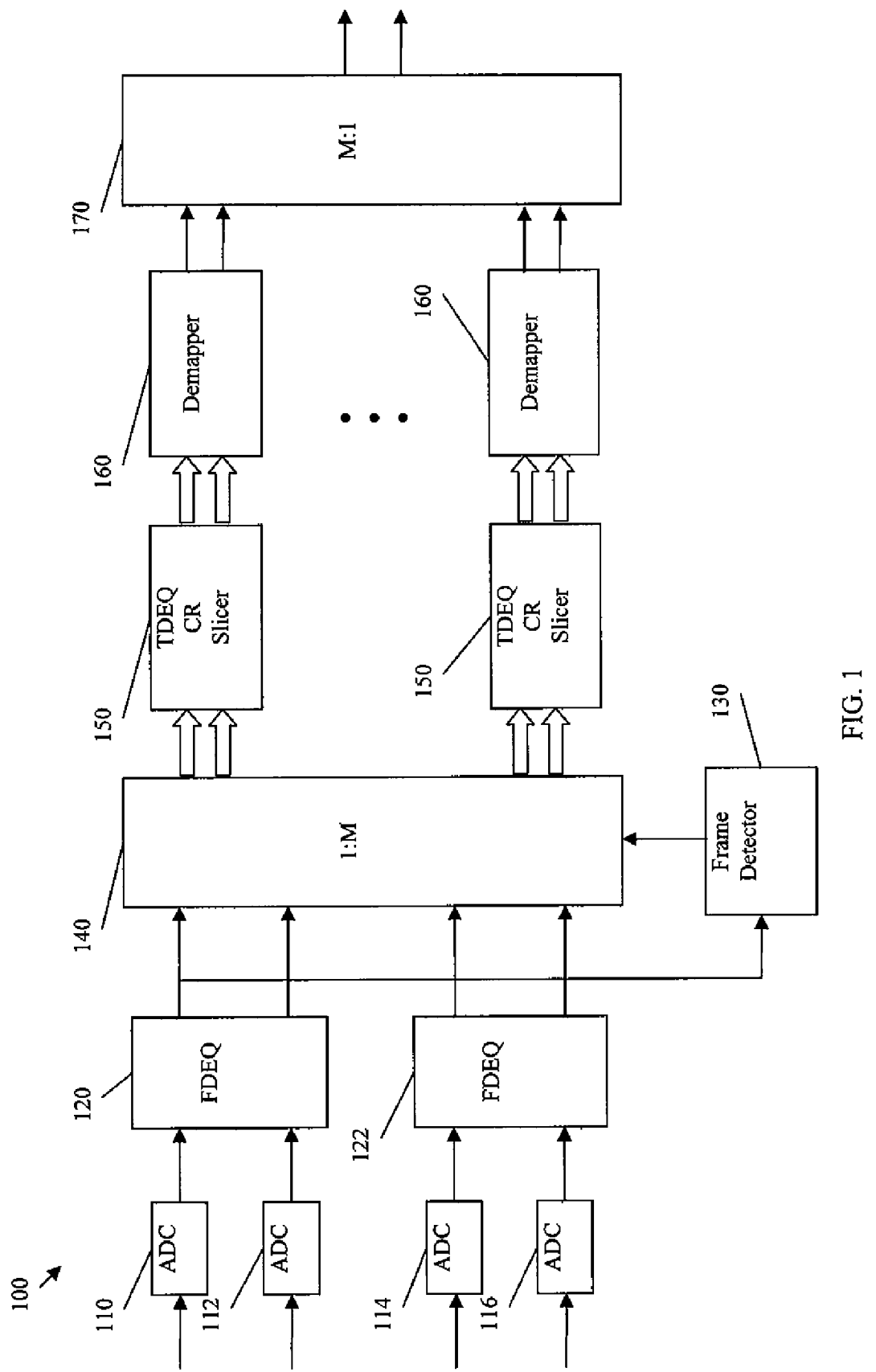
FIG. 1 is a schematic diagram of an embodiment of an optical receiver.

FIG. 1 is a diagram of an embodiment of an optical receiver 100. The optical receiver 100 may comprise a plurality of analog to digital converters (ADC) 110, 112, 114, 116, a first frequency domain equalizer (FDEQ) 120 and a second FDEQ 122, a frame detector 130, a demultiplexer 140, at least one time domain equalizer (TDEQ) 150, at least one demapper 160, and a multiplexer 170, which may be arranged as shown in FIG. 1. Specifically, each of the first FDEQ 120 and the second FDEQ 122 may be coupled to some of the ADCs 110, 112, 114, 116, and to the demultiplexer 140. For example, the first FDEQ 120 may be coupled to the ADCs 110, 122, and the second FDEQ may be coupled to the ADCs 114, 116. Additionally, the frame detector 130 may be coupled to the first FDEQ 120, the second FDEQ 122, and the demultiplexer 140. Each TDEQ 150 may be coupled to the demultiplexer 140 and to a corresponding demapper 160, which may be coupled to the multiplexer 170.

The optical receiver 100 may be any device that is configured to receive a first polarized signal and a second polarized signal, which may be orthogonally polarized. For example, the first signal may be an x-polarized signal and the second signal may be a y-polarized signal. Each polarized signal may comprise a quadrature (Q) component and an in-phase (I) component. Each component of the polarized signals may be received at one of the ADC 110, 112, 114, 116. For example, the ADC 110 may receive the I component of the first polarized signal, the ADC 112 may receive the Q component of the first polarized signal, the ADC 114 may receive the I component of the second polarized signal, and the ADC 116 may receive the Q component of the second signal. The ADCs 110, 112, 114, 116 may convert the received signals from an analog to a digital signal format.

The first FDEQ 120 and second FDEQ 122 may be any device that is configured to receive the signal components from the ADCs 110, 112, 114, 116 and perform signal conditioning, e.g. to compensate for chromatic dispersion or other signal distortions in the signal components. The first FDEQ 120 and the second FDEQ 122 may then send the signal components to the frame detector 130 and/or the demultiplexer 140. The demultiplexer 140 may be any device that is configured to split the received signal components into parallel bit steams. Splitting the received signal components into parallel bit streams may reduce the required sample rate at the TDEQ 150. The quantity of parallel bit streams may determine the sample rate at each TDEQ 150. The optical receiver 100 may comprise any number of TDEQs 150 to achieve a desired sample rate at the TDEQs 150. For example, if the optical receiver 100 comprises about two TDEQs 150, the sample rate at the first FDEQ 120 and the second FDEQ 122 may be reduced by about a factor of two at each of the TDEQs 150. Further, the frame detector 130 may be any device that is configured to control the demultiplexer 140, and thus determine the output of the demultiplexer 140. The frame detector 130 may use various techniques to detect the frames, e.g. based on input from the first FDEQ 120 and the second FDEQ 122, as discussed in detail below.

The TDEQ 150 may be any device that is configured to receive frames from the output of the demultiplexer 140 and process the frames using a finite impulse response (FIR) filter. The FIR tap weights may be adjusted to separate the frames of the different polarized signals received from the demultiplexer 140. The tap weights may be varied to adapt to a level of inter-symbol interference (ISI) in the optical signals. For instance, the TDEQ 150 may be an adaptive multi-input multi-output (MIMO) TDEQ coupled to a carrier recovery (CR) loop and a slicer. The CR loop may be configured to compensate for any frequency and/or phase differences between the received signals and a local oscillator, which may improve signal demodulation. The slicer may make a decision, e.g. based upon a magnitude of a received signal in a given time frame, as to whether the value of the signal is a digital high or a digital low value.

The demapper 160 may be any device that is configured to receive the signal (e.g. frames) from the output of the TDEQ 150 and convert the received signal into a bit sequence, which may then be sent to the multiplexer 170. The multiplexer 170 may be any device that is configured to combine the bit sequences, e.g. from the plurality of TDEQs 150 and demappers 160, to provide about two output bit streams that correspond to the two optical signals received at the ADCs 110, 112, 114, 116.

Figure 2:
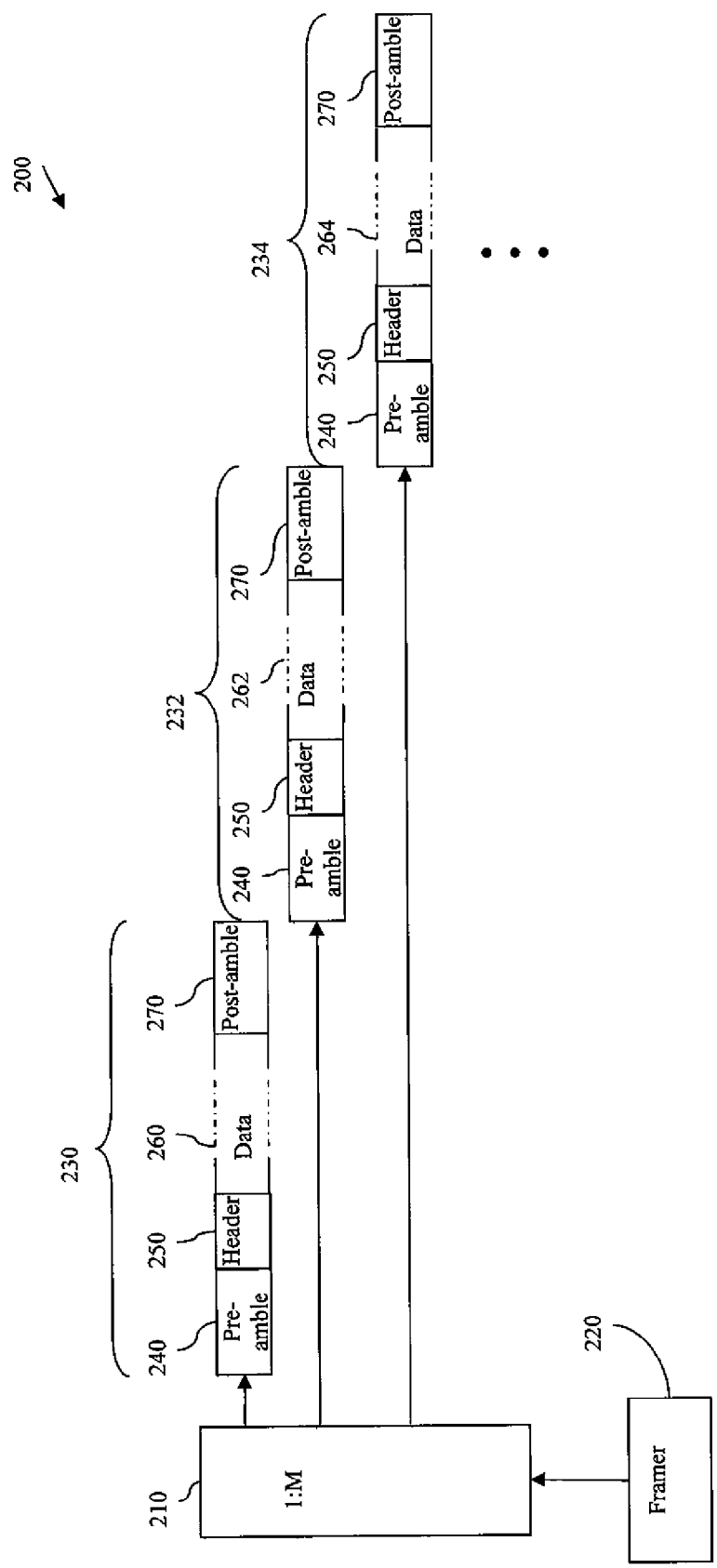
FIG. 2 is a schematic diagram of an embodiment of a framing scheme.

FIG. 2 illustrates one embodiment of a framing scheme 200 that may be used in an optical receiver. The framing scheme 200 may comprise a demultiplexer 210 and a framer 220, which may be substantially similar to the frame detector 130 and the demultiplexer 140, respectively. The framer 220 may provide an input to the demultiplexer 210 to train the demultiplexer 210 for framing a received signal (not shown). The demultiplexer 210 may receive the signal as input and output a plurality of frames 230, 232, 234, which may be based on the input from the framer 220. The frames 230, 232, 234 may comprise a pre-amble 240, a header 250, a plurality of data blocks 260, 262, 264, and a post-amble 270. The format of the pre-amble 240, header 250, and post-amble 270 may be substantially similar in the frames 230, 232, 234. The pre-amble 240, header 250, and post-amble 270 may be used to identify which polarized signal, e.g. x-polarized or y-polarized signal, to which the frames 230, 232, 234 belong. The data blocks 260, 262, 264 may comprise payload data in the frames 230, 232, 234. The payload data may be voice, video, or other data to be transported in a network. The demultiplexer 210 may be configured to transmit the frames 230, 232, 234 without such that they do not overlap, e.g. in time. Thus, the frames may be received, e.g. by a TDEQ 150, without substantial overlap between the post-amble 270, the pre-amble 240, and the header 250, which may be combined in that sequence to obtain a composite header.

The post-amble 270 in frame 230, and the pre-amble 240 and header 250 in frame 232 may be combined, e.g. by the TDEQ 150, in that sequence to obtain a composite header. The composite header may be used for frame detection in the receiver 100. Frame detection may be based upon the auto-correlation property of the composite header. The post-amble 270 and the pre-amble 240 may be selected and combined with the header 250 to improve auto-correlation property that may be detected. The combination of the post-amble 270, the pre-amble 240, and the header 250 may comprise a bit sequence that has substantially better auto-correlation function than the bit sequence of the header separately. The receiver may use the composite header, which may comprise the post-amble 270, the pre-amble 240, and the header 250, to achieve frame detection based on the improved auto-correlation property of the composite header, e.g. with respect to the auto-correlation property of the header 250 alone.

Additionally, the header 250 that may correspond to a first polarized signal (e.g. x-polarized signal) may comprise a bit sequence that may have a desirable cross-correlation property, e.g. with respect to a second polarized signal (e.g. a y-polarized signal). A desirable cross-correlation property between headers that correspond to two different polarized signals may promote efficient and reliable polarization separation in the receiver. As such, the bit sequence in the header 250 may be used to identify and separate the frames that belong to different polarized signals, e.g. an x-polarized signal and a y-polarized signal. Since the sequence of bits in the header 250 may be configured for a desirable cross-correlation property, the header bit sequence may not have a desirable auto-correlation property. Therefore, the receiver may use the composite header which may be configured for desirable auto-correlation, to accomplish frame detection, and subsequently use the header for polarization separation.

Figure 3:
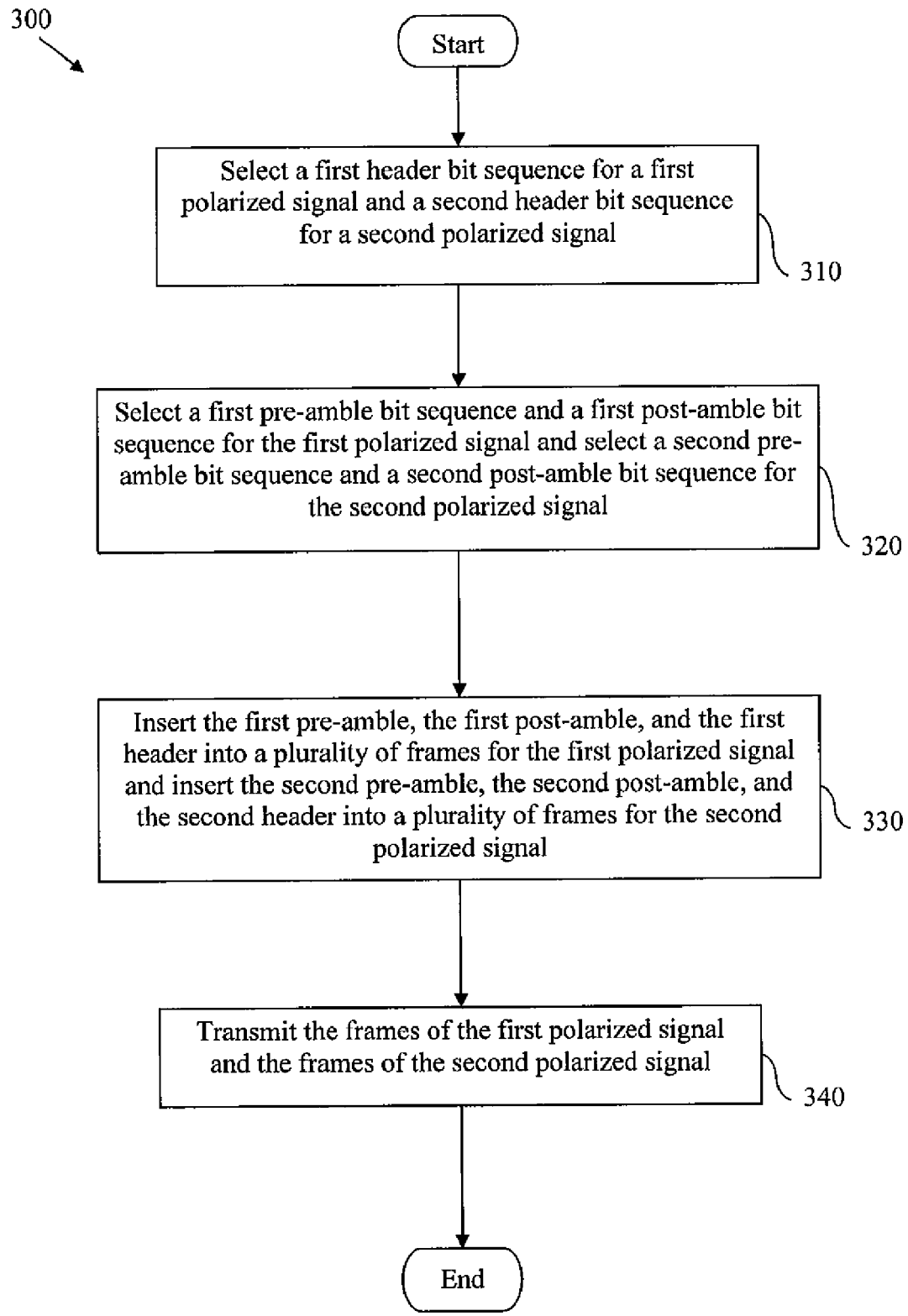
FIG. 3 is a flowchart of an embodiment of a composite header framing method.

FIG. 3 is a flowchart of an embodiment of a composite header framing method 300. The method 300 begins at block 310, where a first header bit sequence for a first polarized signal and a second header bit sequence for a second polarized signal may be selected. The first header bit sequence and second header bit sequence may be selected to obtain a desirable cross-correlation function between two different polarized signals, e.g. an x-polarized signal and a y-polarized signal. The desirable cross-correlation improves the chance of successful separation between the frames that correspond to the different polarized signals. At block 320, a first pre-amble bit sequence and first post-amble bit sequence may be selected for the first polarized signal and a second pre-amble bit sequence and second post-amble bit sequence may be selected for the second polarized signal. The pre-amble and post-amble bit sequences may be selected to obtain a desirable auto-correlation function of the composite header in each polarized signal. The pre-amble bit sequence and post-amble bit sequence may be selected based upon the header bit sequence selected in step 310 to improve the auto-correlation function of the composite header, e.g. in comparison to the auto-correlation property of the header alone. The desirable auto-correlation function of the composite header may be detected with substantially high probability, which may improve the chance of successful identification and detection of each frame. At block 330, the first pre-amble, first header, and first post-amble may be inserted in a plurality of frames for the first polarized signal, and the second pre-amble, second header, and second post-amble may be inserted in a plurality of frames for the second polarized signal. At block 340, the frames of the first polarized signal and the second polarized signal may be transmitted. Specifically, each frame may be transmitted in sequence without overlapping with a previous frame or a subsequent frame. Consequently the frames may be received such that the pre-amble, header, and post-amble may be detected without substantial overlap.

Figure 4:
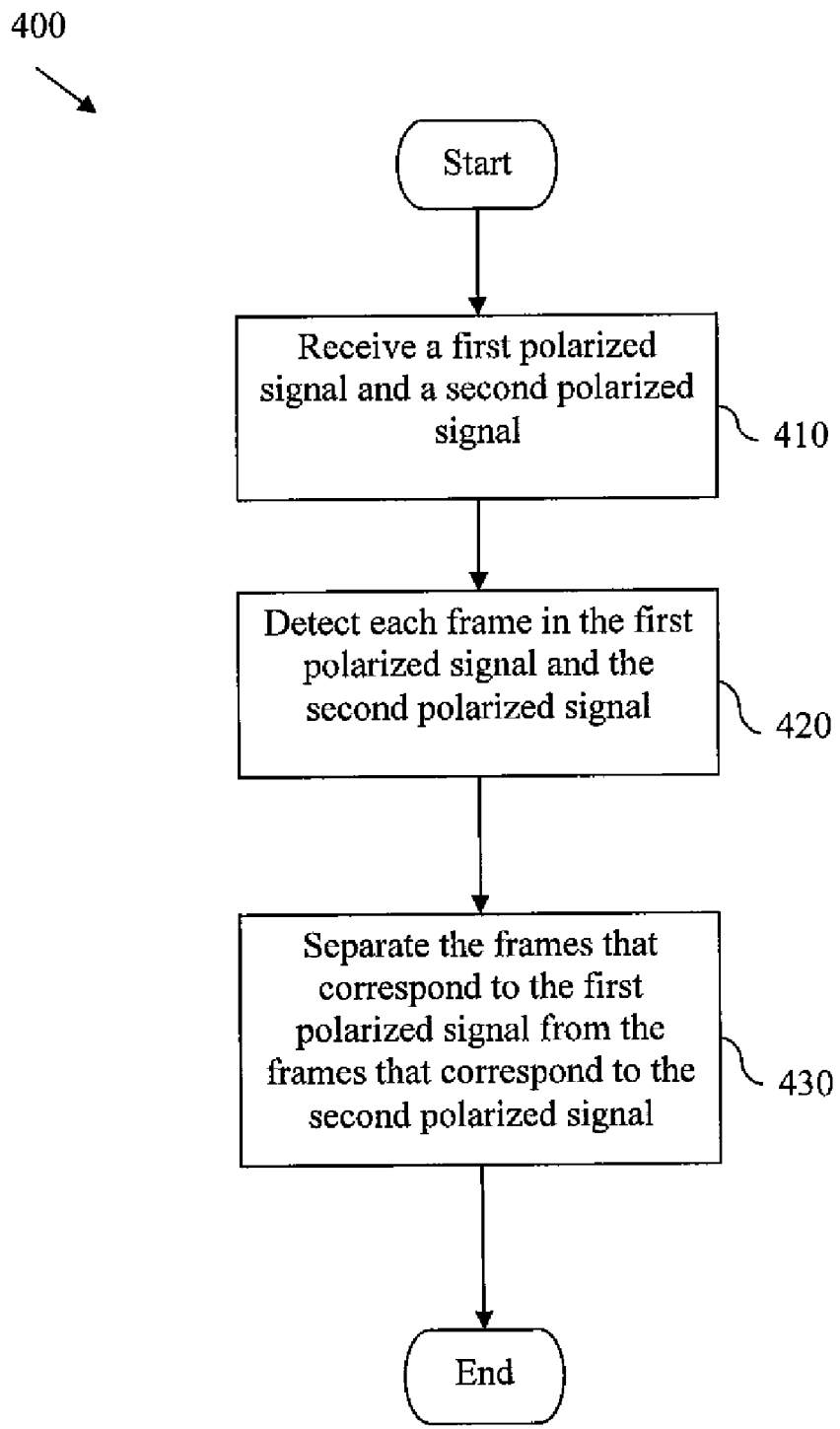
FIG. 4 is a flowchart of an embodiment of a frame detection and polarization separation method.

FIG. 4 is a flowchart of an embodiment of a frame detection and polarization method. The method 400 may begin at block 410, where a first polarized signal (e.g. a polarized optical signal) and a second polarized signal (e.g. a polarized optical signal) may be received. For example, the first polarized signal and the second polarized signal may be received at the receiver 100. Each signal may comprise a plurality of frames, which may comprise a header and/or composite header that indicates the first optical signal or the second optical signal. At block 420, each frame in the first polarized signal or the second polarized signal may be detected. Specifically, each frame in the sequence of frames may be detected and identified by detecting the auto-correlation function that corresponds to the bit sequence in the composite header, e.g. which may be obtained from a frame or from two consecutive frames. The auto-correlation function of the composite header may be detected by the frame detector 130. For example, the detected auto-correlation function may correspond to a combination of a post-amble at the end of a first frame in the sequence, and a pre-amble and header at the beginning of a second frame that succeeds the first frame in the sequence. At block 430, the frames that correspond to the first polarized signal may be separated from the frames that correspond to the second polarized signal. Specifically, the header in the composite header of each frame may be used to identify which polarized signal the frame belongs to, e.g. an x-polarized signal or a y-polarized signal. The frames that correspond to two different polarizations may be separated by using the cross-correlation of the bit sequences in the header of the frame. The separated frames may then be associated with their corresponding polarized signal for subsequent processing.

Figure 5:
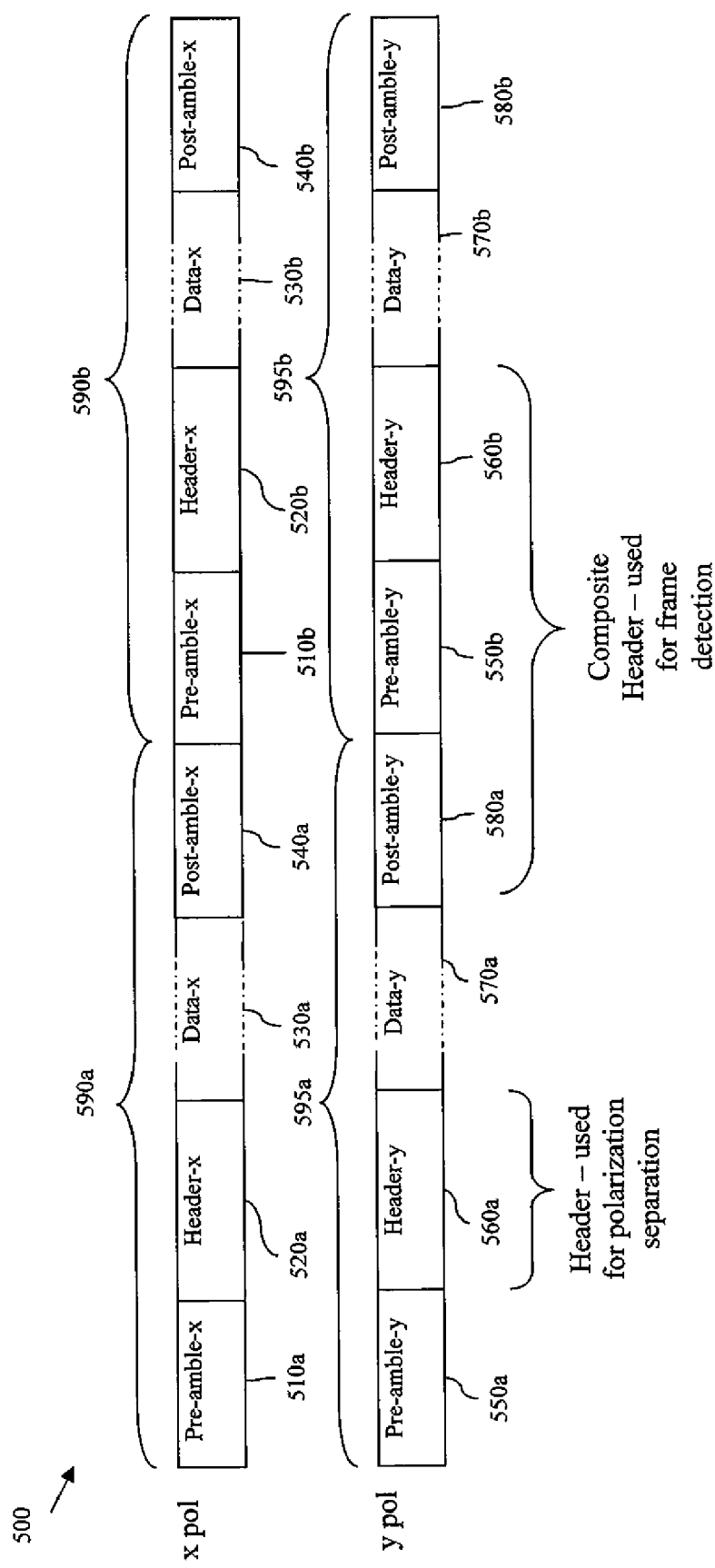
FIG. 5 is a schematic diagram of an embodiment of two bit streams.

FIG. 5 is a diagram of two polarized signals 500. The polarized signals 500 may comprise an x-polarized signal and a y-polarized signal. The x-polarized signal may comprise a plurality of frames 590a and 590b, and the y-polarized signal may comprise a plurality of frames 595a and 595b. While only two frames are illustrated in each of the x- and y-polarization signals, it will be appreciated that these signal can contain any number of frames. The frame 590a may comprise a first pre-amble 510a (pre-amble-x), a first header 520a (header-x), a first data 530a (data-x), and a first post-amble 540a (post-amble-x). The frame 590b may comprise a first pre-amble 510b (pre-amble-x), a first header 520b (header-x), a first data 530b (data-x), and a first post-amble 540b (post-amble-x). Thus, the first composite header may comprise the first post-amble 540a, the first pre-amble 510b, and the first header 520b. Similarly, the frame 595a in the y-polarized signal may comprise a second pre-amble 550a (pre-amble-y), a second header 560a (header-y), a second data 570a (data-y), and a second post-amble 580a (post-amble-y). The frame 595b in the y-polarized signal may comprise a second pre-amble 550b (pre-amble-y), a second header 560b (header-y), a second data 570b (data-y), and a second post-amble 580b (post-amble-y). Thus, the second composite header may comprise the second post-amble 580a, the second pre-amble 550b, and the second header 560b. The first data 530 and second data 570 may comprise similar payload to provide signal redundancy or different payload to provide increased payload capacity.

The bit sequences of the first header 520 and second header 560 may have substantially distinguishable and detectable cross-correlation to achieve improved polarization separation in the two signals. The tap weights for the TDEQ in the receiver may be adjusted based on the bit sequences of first header 520 and second header 560 to improve polarization separation. Specifically, the first header 520 or second header 560 may be processed and used for polarization separation without first pre-amble 510, first post-amble 540, second pre-amble 550, and second post-amble 580.

The x-polarized signal and the y-polarized signal may each comprise a real component and an imaginary component. The real component may correspond to an in-phase (I) component, and the imaginary component may correspond to a quadrature (Q) component. An auto-correlation function for each of the x-polarized signal and the y-polarized signal may be used for frame detection of each of the x-polarized signal and the y-polarized signal, respectively. The auto-correlation function each of the x-polarized signal and the y-polarized signal may be a complex function of the I and Q components of each of the x-polarized signal and the y-polarized signal, respectively. Thus, similar to the x-polarized signal and the y-polarized signal, the auto-correlation function may be a complex function comprising a real component (real(autocorrelation)) and an imaginary component. Additionally, an absolute auto-correlation (abs(autocorrelation)) function may be obtained based on the real component and the imaginary component of the auto-correlation function.

A cross-correlation function for the x-polarized signal and the y-polarized signal may be used for polarization separation. The cross-correlation function may be a complex function of the I and Q components of both the x-polarized signal and the y-polarized signal. Thus, similar to the x-polarized signal and the y-polarized signal, the cross-correlation function may be a complex function comprising a real component (real(crosscorr(x,y))) and an imaginary component. Additionally, an absolute cross-correlation (abs(crosscorr(x,y))) function may be obtained based on the real component and the imaginary component of the cross-correlation function.

In some cases, the bit sequences for the header in the x-polarized signal and the y-polarized signal may be single complex tones, which may have a positive and a negative frequency component, e.g. in a Fourier domain. For example, the bit sequences for the header in the x-polarized signal and y-polarized signal may comprise:

| I (x-pol): | 100110011001 |
|---|---|
| Q (x-pol): | 110011001100 |
| I (y-pol): | 100110011001 |
| Q (y-pol): | 001100110011 | which may be referred to herein as sequence A.

Figure 6:
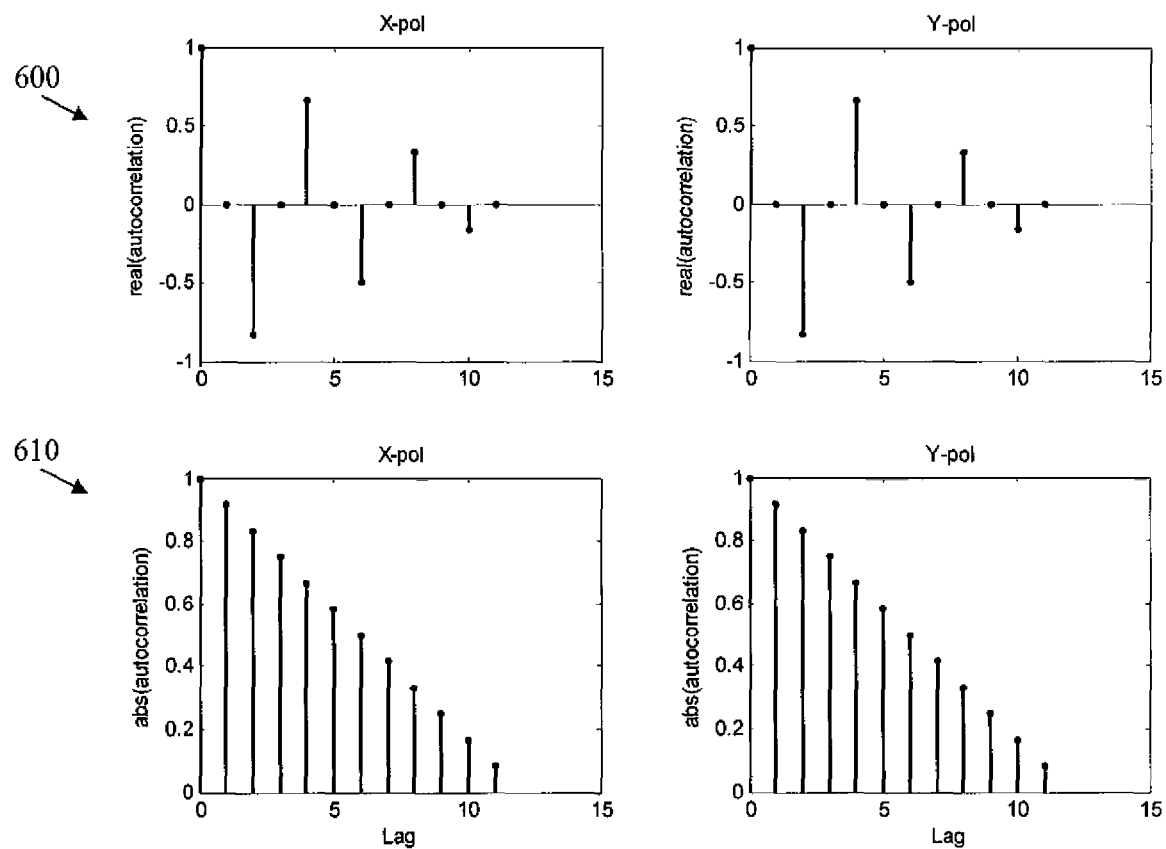
FIG. 6 is a chart of an embodiment of an auto-correlation of a signal.

FIG. 6 is a graph of an auto-correlation of the bit sequences for the x-polarized signal and y-polarized signal comprising sequence A. The real components 600 of the auto-correlation functions (real(autocorrelation)) are shown for the x-polarized (X-pol) signal and the y-polarized (Y-pol) signal. The absolute values 610 of the auto-correlation functions (abs (autocorrelation)) are also shown for the x-polarized signal and the y-polarized signal. The absolute values 610 for each of the x-polarized signal and y-polarized signal may comprise a substantially high value, e.g. equal to about one, at a time (or time lag) equal to about zero. However, the absolute values 610 may then decrease gradually as the time lag increases. Such auto-correlation pattern makes the detection of the position of peak value less reliable. Hence, sequence A may not be desirable for frame detection. A desirable auto-correlation function may comprise a distinguishable peak, e.g. where the absolute values 610 of the auto-correlation function may comprise a substantially high value, e.g. at a lag of about zero, and substantially low values elsewhere.

Figure 7:
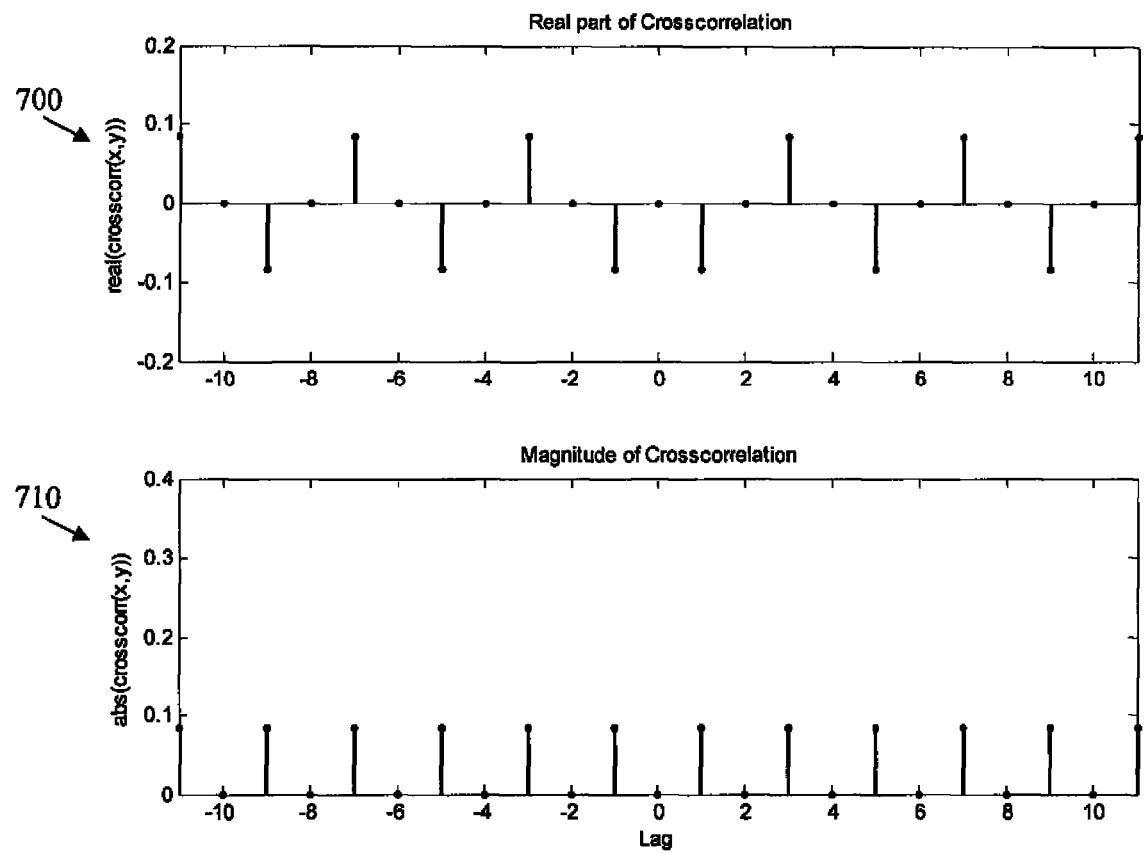
FIG. 7 is a chart of an embodiment of a cross-correlation of two signals.

FIG. 7 is a graph of a cross-correlation of the sequence A. The real components 700 of the cross-correlation function (real(crosscorr(x,y))) are shown for the x-polarized signal and the y-polarized signal. The absolute values 710 of the cross-correlation function (abs(crosscorr(x,y))) are also shown for the x-polarized signal and the y-polarized signal. The absolute value 710 may comprise a sequence of substantially low values, e.g. equal to about 0.1 or about zero. Such cross-correlation property, which may comprise a range of substantially low values, enhance the chance of success of polarization separation through TDEQ training. Thus, the cross-correlation property of sequence A may be advantageous for polarization separation.

In other cases, the bit sequences in the x-polarized signal and the y-polarized signal may be pilot tones, which may comprise a plurality of frequency components. For example, the bit sequences for the header for the x-polarized signal and y-polarized signal may comprise:

| I (x-pol): | 100111000011 |
|---|---|
| Q (x-pol): | 110011110000 |
| I (y-pol): | 100111000011 |
| Q (y-pol): | 001100001111 | which may be referred to herein as sequence B.

Figure 8:
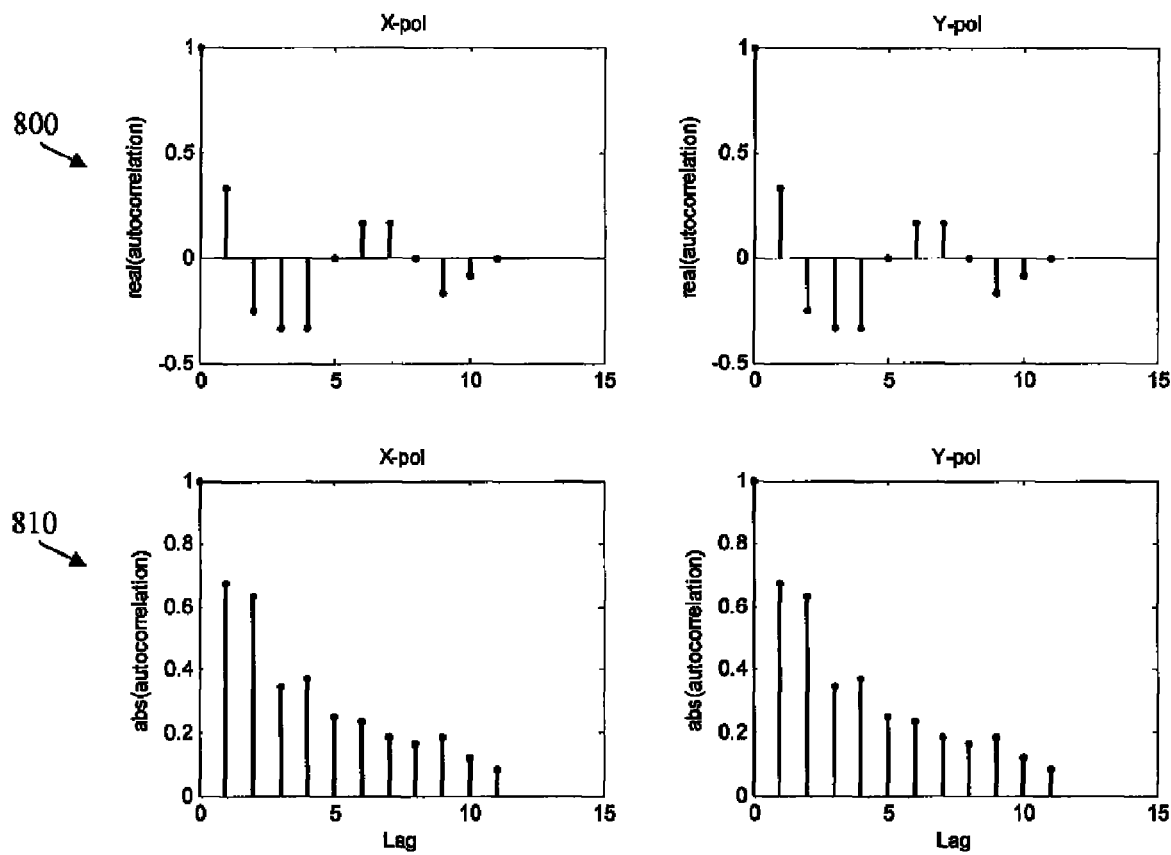
FIG. 8 is a chart of another embodiment of an auto-correlation of a signal.

FIG. 8 is a graph of an auto-correlation of the sequence B. The real components 800 of the auto-correlation functions are shown for the x-polarized signal and the y-polarized signal. The absolute values 810 of the auto-correlation functions are also shown for the x-polarized signal and of the y-polarized signal. Similar to the absolute values 610 of the auto-correlation functions of sequence A, the absolute values 810 of the auto-correlation functions for each of the x-polarized signal and y-polarized signal may comprise a substantially high value, e.g. equal to about one, at a time lag equal to about zero and a plurality of decreasing values as the time lag increases. Since such a pattern or sequence of values may not comprise a distinguishable peak, sequence B may not be desirable for frame detection.

Figure 9:
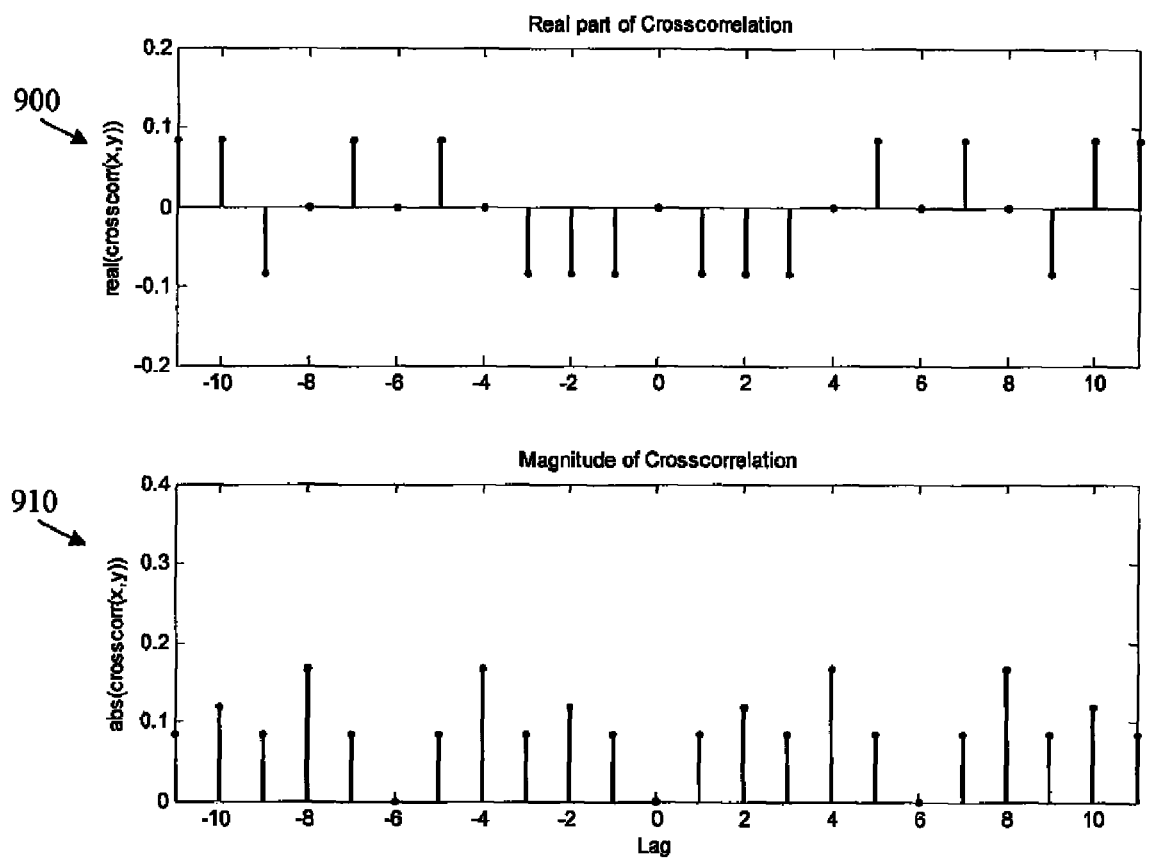
FIG. 9 is a chart of another embodiment of a cross-correlation of two signals.

FIG. 9 is a graph of a cross-correlation of the sequence B. The real components 900 of the cross-correlation function are shown for the x-polarized signal and the y-polarized signal. The absolute values 910 of the cross-correlation function are also shown for the x-polarized signal and the y-polarized signal. Similar to the absolute values 710 of the cross-correlation function of sequence A, the absolute values 910 of the cross-correlation function of sequence B may comprise a sequence of substantially low values, e.g. equal to about 0.1 or about 0.15. Since the absolute values 910 may be greater than the absolute values 710, the range of absolute values 910 may be further from zero and thus detected with less reliability than the range of absolute values 710. Hence, the cross-correlation property of sequence B may be less advantageous than sequence A for polarization separation.

In other cases, the bit sequences in the x-polarized signal and the y-polarized signal may correspond to a 13-bit Barker sequence. The bits for x-polarization are mapped to points in the first and third quadrants, whereas the bits for y-polarization are mapped to points in the second and fourth quadrants. For example, the bit sequences for the header for the x-polarized signal and y-polarized signal may comprise:

| I (x-pol): | 1111100110101 |
|---|---|
| Q (x-pol): | 1111100110101 |
| I (y-pol): | 1010110011111 |
| Q (y-pol): | 0101001100000 | which may be referred to herein as sequence C.

Figure 10:
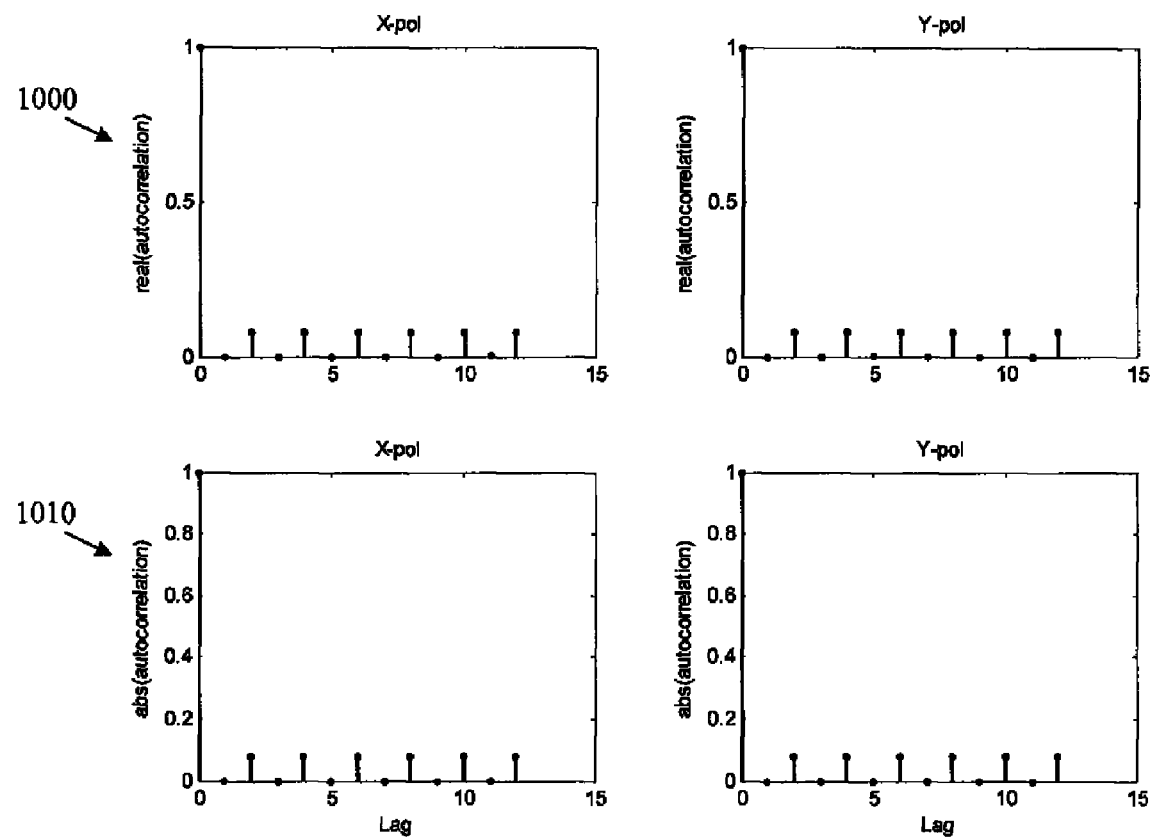
FIG. 10 is a chart of another embodiment of an auto-correlation of a signal.

FIG. 10 is a graph of an auto-correlation of the sequence C. The real components 1000 of the auto-correlation functions are shown for the x-polarized signal and the y-polarized signal. The absolute values 1010 of the auto-correlation functions are also shown for the x-polarized signal and the y-polarized signal. Unlike the absolute values 610 and the absolute values 810 of the auto-correlation functions of sequence A and sequence B, respectively, the absolute values 1010 of the cross-correlation functions of sequence C may comprise a substantially high value, e.g. equal to about one, at a time lag equal to about zero and a plurality of substantially low values elsewhere, which may define a distinguishable peak at about zero time lag. Thus, the auto-correlation property of sequence C may be advantageous for frame detection.

Figure 11:
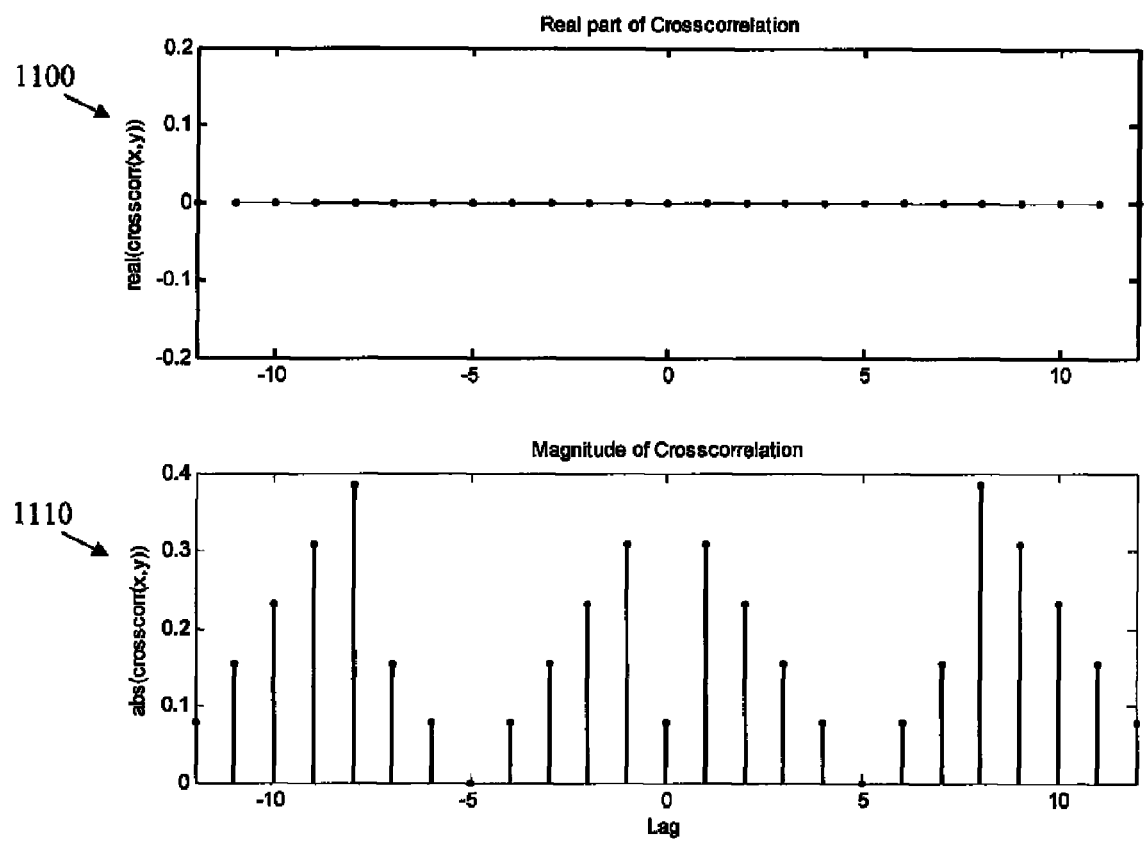
FIG. 11 is a chart of another embodiment of a cross-correlation of two signals.

FIG. 11 is a graph of a cross-correlation of the sequence C. The real components 1100 of the cross-correlation function are shown for the x-polarized signal and the y-polarized signal. The absolute values 1110 of the cross-correlation function are also shown for the x-polarized signal and the y-polarized signal. Unlike the absolute values 710 and the absolute values 910 of the cross-correlation function of sequence A and sequence B, respectively, the absolute values 1110 of the cross-correlation function of sequence C may comprise a sequence of values, e.g. equal to about 0.2, about 0.3, or about 0.4, which may be greater than the absolute values 710 and the absolute values 910 of the cross-correlation function of sequence A and sequence B, respectively. The relatively larger cross-correlation of sequence C makes it less advantageous than sequence A and sequence B for polarization separation.

A composite header may comprise a header, a post-amble, and a pre-amble. In an embodiment, a header bit sequence that corresponds to the x-polarized signal and y-polarized signal may be a single complex tone or a pilot tone. As such, the header may comprise about 12 bits, which may be similar to sequence A or sequence B. Such a header may have a desirable cross-correlation property that may be used for polarization separation as shown above. Subsequent to selecting a header bit-sequence, the post-amble bit sequence and the pre-amble bit sequence in the composite header may be selected to enable frame detection using the composite header. Frame detection may be achieved by selecting a composite header with a desirable auto-correlation function.

Each of the pre-amble bit sequence and post-amble bit-sequence may comprise about two bits. Hence, the composite header may comprise about 16 bits. There may be about four valid pairs of bit sequences that may be used for the pre-amble and post-amble, such as (0,0), (0,1), (1,0), and (1,1). The post-amble bit sequence and the pre-amble bit sequence may be selected to improve the auto-correlation property of the composite header, e.g. to obtain a distinguishable absolute value peak in the auto-correlation function. For example, the post-amble bit sequence and the pre-amble bit sequence may be selected such that at time equal zero, the auto-correlation function may be maximized; at all other times, the maximum value of the auto-correlation function may be minimized, such that the following equation is satisfied:

$$\min_{\substack{post-amble \\ pre-amble}} \left\{ \max_{n \neq 0} |R(n)| \right\}$$

In an embodiment, if the header bit sequences comprise sequence A for the x-polarized signal and y-polarized signal, the composite header bit sequences may comprise:

| I (x-pol): | 0010100110011001 |
|---|---|
| Q (x-pol): | 0111110011001100 |
| I (y-pol): | 0010100110011001 |
| Q (y-pol): | 1000001100110011 | which may be referred to herein as sequence D.

Figure 12:
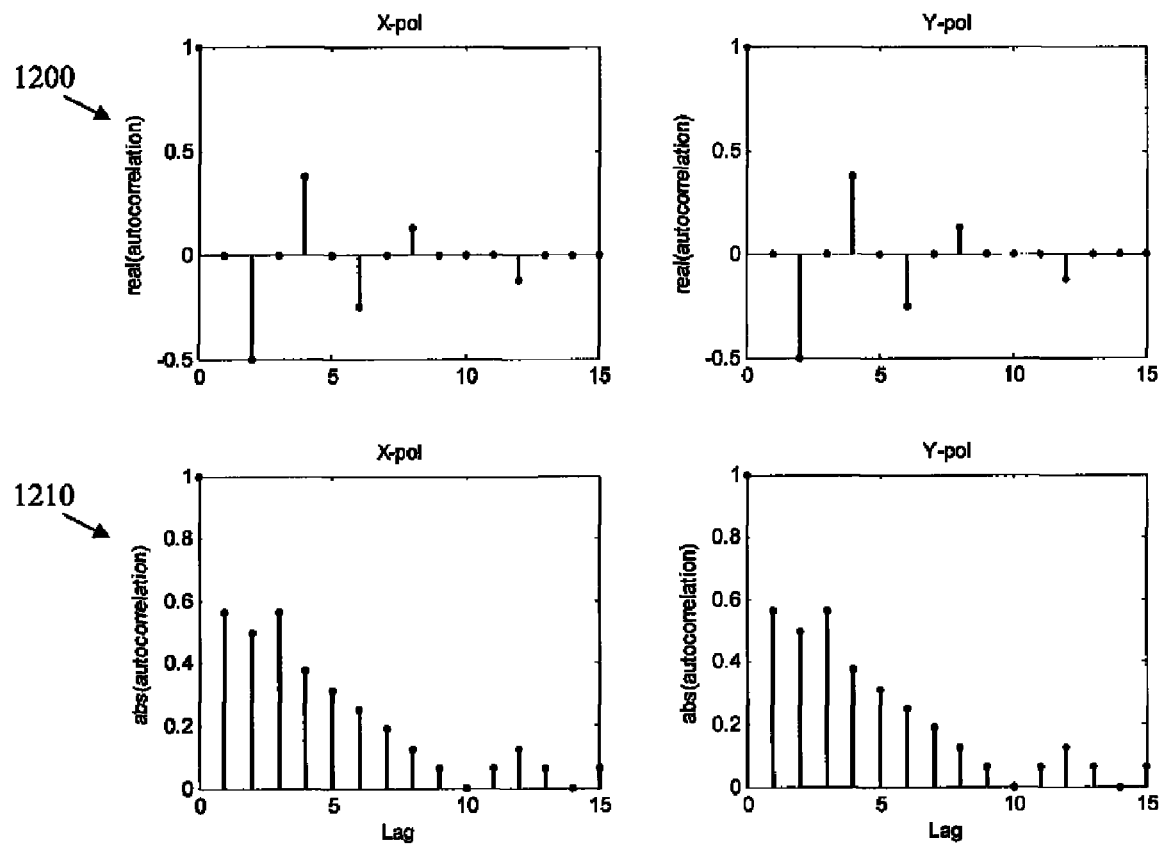
FIG. 12 is a chart of another embodiment of an auto-correlation of a signal.

FIG. 12 is a graph of an auto-correlation of the sequence D. The real components 1200 of the auto-correlation functions are shown for the x-polarized signal and the y-polarized signal. The absolute values 1210 of the auto-correlation functions are also shown for the x-polarized signal and the y-polarized signal. In comparison to the absolute values 610 and the absolute values 810 of the auto-correlation functions of sequence A and sequence B, respectively, the absolute values 1210 of the auto-correlation functions of sequence D may comprise a substantially high value, e.g. equal to about one, at a time lag equal to about zero and a plurality of lower values elsewhere, which may define a distinguishable peak at about zero time lag. Thus, the auto-correlation property of sequence D may be advantageous for frame detection.

Alternatively, if the header bit sequences comprise sequence B for the x-polarized signal and y-polarized signal, the composite header bit sequences may comprise:

| I (x-pol): | 1000100111000011 |
|---|---|
| Q (x-pol): | 1011110011110000 |
| I (y-pol): | 1000100111000011 |
| Q (y-pol): | 1110001100001111 | which may be referred to herein as sequence E.

Figure 13:
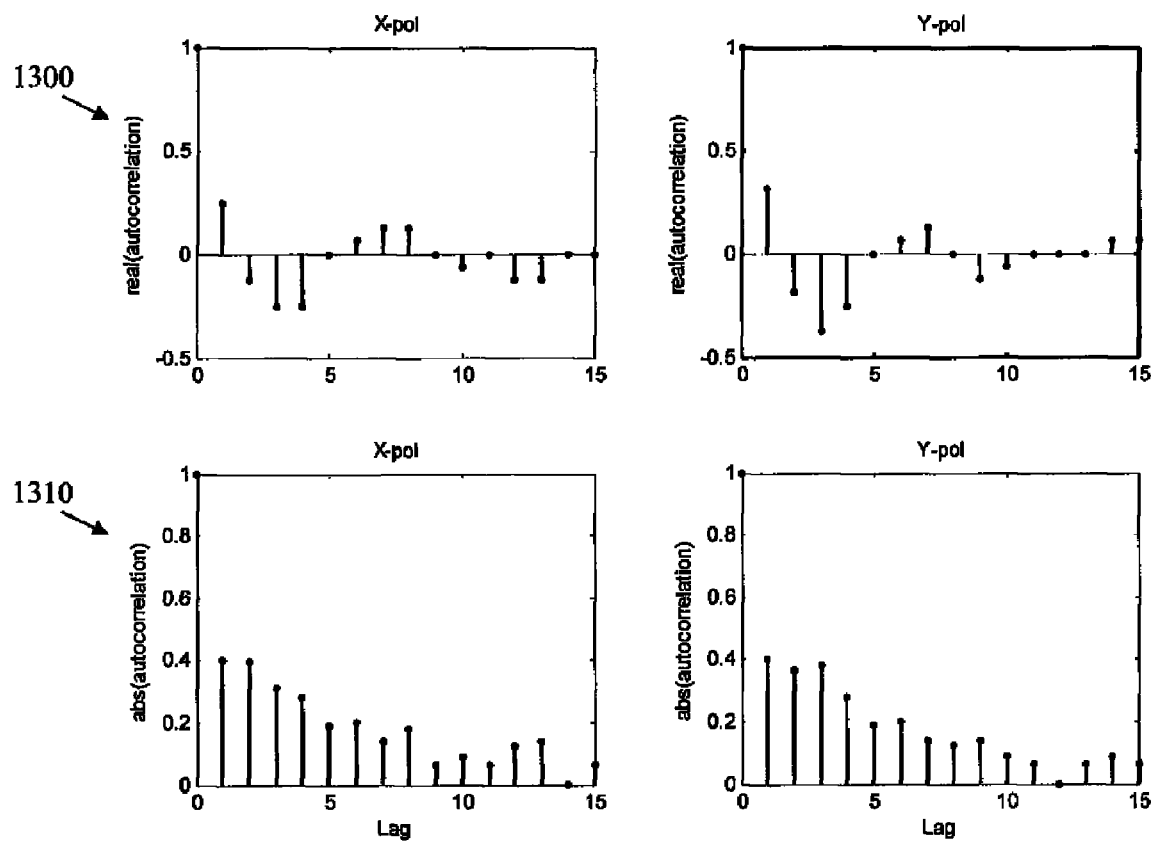
FIG. 13 is a chart of another embodiment of an auto-correlation of a signal.

FIG. 13 is a graph of an auto-correlation of the sequence E. The real components 1300 of the auto-correlation functions are shown for the x-polarized signal and the y-polarized signal. The absolute values 1310 of the auto-correlation functions are also shown for the x-polarized signal and the y-polarized signal. Similar to the absolute values 1210 of the auto-correlation functions of sequence D, the absolute values 1310 of the auto-correlation functions of sequence E may also comprise a substantially high value, e.g. equal to about one, at a time lag equal to about zero and a plurality of lower values elsewhere, which may define a distinguishable peak at about zero time lag. Thus, the auto-correlation property of sequence E may also be used for frame detection.

Figure 14:
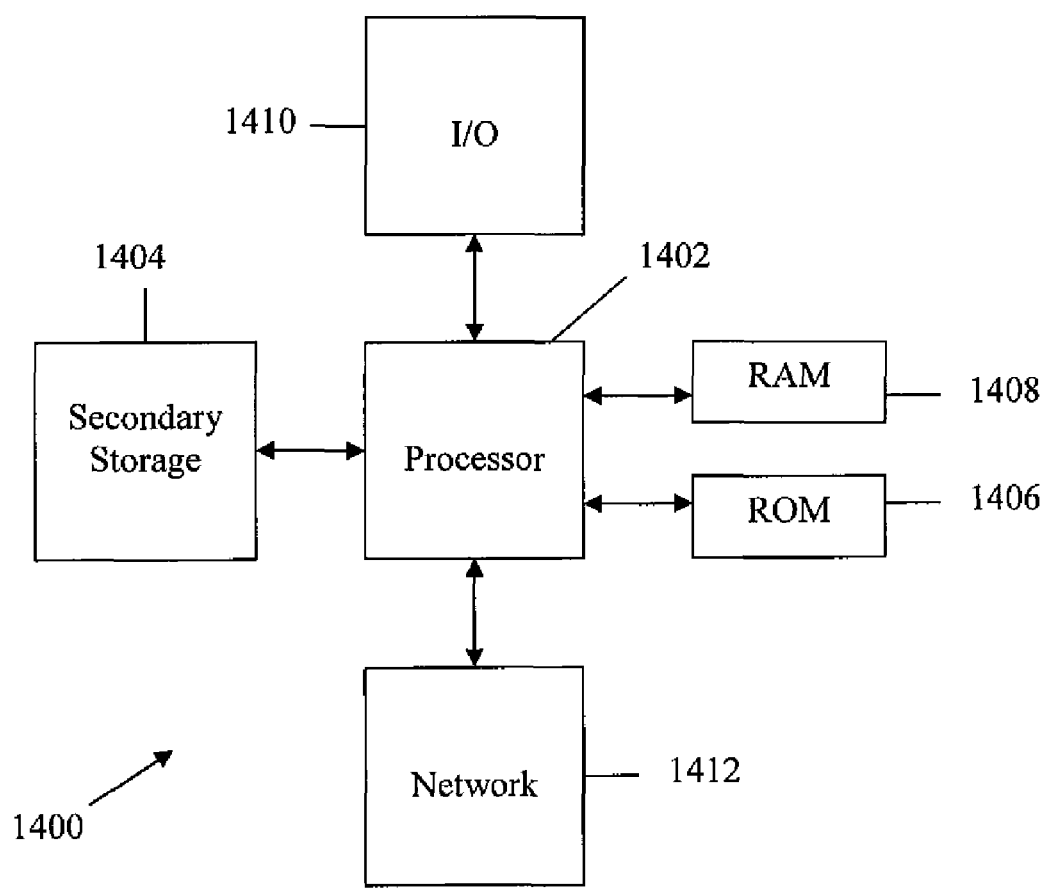
FIG. 14 is a schematic diagram of an embodiment of a general purpose computer.

The network components described above may be implemented on any general-purpose network component, such as a computer or network component with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more application specific integrated circuits (ASICs).

The secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical receiver comprising:
a frame detector configured to receive a polarized signal comprising a first bit stream and a second bit stream, and further configured to identify a plurality of frames in the first bit stream and the second bit stream using a composite header and a second composite header; and
a time-domain equalizer (TDEQ) configured to separate the first bit stream and the second bit stream using a portion of the composite header,
wherein the composite header comprises a first post-amble, a first header, and a first pre-amble,
wherein the second composite header comprises a second-post amble, a second header, and a second pre-amble,
wherein a first bit sequence is selected for the first header and a second bit sequence is selected for the second header, wherein the first header and the second header are distinguished using a cross-correlation function of the first bit sequence and the second bit sequence,
wherein a third bit sequence is selected for the first pre-amble and a fourth bit sequence is selected for the first post-amble, wherein the first post-amble, the first pre-amble, and the first heading are detectable using an auto-correlation function of the first bit sequence, the third bit sequence, and the fourth bit sequence, and
wherein a fifth bit sequence is selected for the second pre-amble and a sixth bit sequence is selected for the second post-amble, wherein the second post-amble, the second pre-amble, and the second header are detectable using an auto-correlation function of the second bit sequence, the fifth bit sequence, and the sixth bit sequence.

2. The optical receiver of claim 1, wherein the composite header comprises about 16 bits, the first header comprises about 12 bits, and each one of the first pre-amble and first post-amble comprises about two bits.

3. The optical receiver of claim 1, wherein the TDEQ is further configured to compensate for pre-cursor inter-symbol interference (ISI) using a finite impulse response (FIR) tap length based on a size of the first post-amble and compensate for post-cursor ISI using a FIR tap length based on a size of the first pre-amble.

4. The optical receiver of claim 1 further comprising:
a first analog to digital converter (ADC) and a second ADC;
a first frequency domain equalizer (FDEQ) coupled to the first ADC, the second ADC, and the frame detector;
a third ADC and a fourth ADC;
a second FDEQ coupled to the third ADC, the fourth ADC, and the frame detector;
a demultiplexer coupled to the frame detector, the first FDEQ, the second FDEQ, and the TDEQ;
a demapper coupled to the TDEQ; and
a multiplexer coupled to the demapper.

5. The optical receiver of claim 1, wherein the first bit stream corresponds to an x-polarized optical signal, and wherein the second bit-stream corresponds to a y-polarized optical signal.

6. An optical network component comprising:
an analog to digital converter (ADC) configured to receive a first signal and generate a portion of a signal from the first signal;
at least one processor coupled to the ADC and configured to:

receive the signal, wherein the signal comprises a first polarized optical signal and a second polarized optical signal;

obtain a first post-amble, a first pre-amble, and a first header from the first polarized optical signal;

obtain a second post-amble, a second pre-amble, and a second header from the second polarized optical signal;

detect a first frame in the first polarized optical signal and a second frame in the first polarized optical signal using the first post-amble, the first pre-amble, and the first header; and separate the first polarized optical signal from the second polarized optical signal using the first header and the second header, wherein a first bit sequence is selected for the first header and a second bit sequence is selected for the second header, wherein the first header and the second header are distinguished using a cross-correlation function of the first bit sequence and the second bit sequence, wherein a third bit sequence is selected for the first pre-amble and a fourth bit sequence is selected for the first post-amble, wherein the first post-amble, the first pre-amble, and the first header are detectable using an auto-correlation function of the first bit sequence, the third bit sequence, and the fourth bit sequence, and wherein a fifth bit sequence is selected for the second pre-amble and a sixth bit sequence is selected for the second post-amble, wherein the second post-amble, the second pre-amble, and the second header are detectable using an auto-correlation function of the second bit sequence, the fifth bit sequence, and the sixth bit sequence.

7. The optical network component of claim 6, wherein the cross-correlation function comprises a range of substantially zero values versus time.

8. The optical network component of claim 6, wherein the first bit sequence corresponds to a single complex tone that has a positive frequency component and a negative frequency component.

9. The optical network component of claim 6, wherein the bit sequence corresponds to an expanded pilot tone that has a plurality of positive frequency components and a plurality of negative frequency components.

10. The optical network component of claim 6, wherein the post amble, the pre-amble, and the header comprise a bit sequence that has an auto-correlation function configured to detect the first frame and the second frame in the first polarized optical signal.

11. The optical network component of claim 10, wherein the improved auto-correlation function comprises a single value of about one and a value of about zero elsewhere.

12. A method comprising:

selecting a first bit sequence for a first header and a second bit sequence for a second header, wherein the first header and the second header are distinguished using a cross-correlation function of the first bit sequence and the second bit sequence;

selecting a third bit sequence for a first pre-amble and a fourth bit sequence for a first post-amble, wherein the first post-amble, the first pre-amble, and the first header are detectable using an auto-correlation function of the first bit sequence, the third bit sequence, and the fourth bit sequence;

selecting a fifth bit sequence for a second pre-amble and a sixth bit sequence for a second post-amble, wherein the second post-amble, the second pre-amble, and the second header are detectable using an auto-correlation function of the second bit sequence, the fifth bit sequence, and the sixth bit sequence; and transmitting a plurality of first frames, wherein the first frames comprise the first pre-amble, the first header, and the first post-amble and corresponds to a first polarized signal; and transmitting a plurality of second frames wherein the second frames comprise the second pre-amble, the second header, and the second post-amble and corresponds to a second polarized signal.

13. The method of claim 12, wherein the first frames are transmitted in sequence without substantial overlap in time.

14. The method of claim 12, wherein the quantity of bits in the first pre-amble and the first post-amble is fixed.

15. A method comprising:

selecting a first bit sequence for a first header and a second bit sequence for a second header, wherein the first header and the second header are distinguished using a cross-correlation function of the first bit sequence and the second bit sequence;

selecting a third bit sequence for a first pre-amble and a fourth bit sequence for a first post-amble, wherein the first post-able, the first pre-amble, and the first header are detectable using an auto-correlation function of the first bit sequence, the third bit sequence, and the fourth bit sequence; and selecting a fifth bit sequence for a second pre-amble and a sixth bit sequence for a second post-amble, wherein the second post-amble, the second pre-amble, and the second header are detectable using an auto-correlation function of the second bit sequence, the fifth bit sequence, and the sixth bit sequence, wherein the quantity of bits in the first pre-amble and the first post-amble is varied according to transmission conditions to reduce inter-symbol interference (ISI).

16. The method of claim 12, wherein each one of the first pre-amble, the first post-amble, the second pre-amble, and the second post-amble comprises about one bit, about two bits, or about three bits.

17. The optical receiver of claim 1, wherein the first post-amble is in a first frame at an end of the first frame and the first pre-amble and the first header are in a second frame at a beginning of the second frame, wherein the second frame is subsequent to the first frame, and wherein the TDEQ uses the first header to separate a frame that corresponds to the first bit stream from a frame that corresponds to the second bit stream.

18. The optical network component of claim 6, wherein the first post-amble is at an end of the first frame, wherein the first, pre-amble and the first header are at a beginning of the second frame, and wherein the second frame is subsequent to the first frame.

19. The optical receiver of claim 17, wherein the first frame and the second frame do not overlap.

* * * * *

UNITED STATES PATENT AND TRADEMARK OFFICE
CERTIFICATE OF CORRECTION

PATENT NO. : 8,391,726 B2
APPLICATION NO. : 12/712655
DATED : March 5, 2013
INVENTOR(S) : Yuanjie Chen et al.

It is certified that error appears in the above-identified patent and that said Letters Patent is hereby corrected as shown below:

In the Claims

Column 13, printed claim 10, should read as:
10. The optical network component of claim 8, wherein the post-amble, the pre-amble, and the header comprise a bit sequence that has an auto-correlation function configured to detect the first frame and the second frame in the first polarized optical signal.

Column 14, printed claim 18, should read as:
18. The optical network component of claim 8, wherein the first post-amble is at an end of the first frame, wherein the first pre-amble and the first header are at a beginning of the second frame, and wherein the second frame is subsequent to the first frame.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,391,726 B2
APPLICATION NO.   : 12/712655
DATED             : March 5, 2013
INVENTOR(S)       : Yuanjie Chen et al.

Page 1 of 1

It is certified that error appears in the above-identified patent and that said Letters Patent is hereby corrected as shown below:

In the Claims

Column 13, lines 44-48, printed claim 10, should read as:
--10. The optical network component of claim 8, wherein the post-amble, the pre-amble, and the header comprise a bit sequence that has an auto-correlation function configured to detect the first frame and the second frame in the first polarized optical signal.--

Column 14, lines 54-58, printed claim 18, should read as:
--18. The optical network component of claim 8, wherein the first post-amble is at an end of the first frame, wherein the first pre-amble and the first header are at a beginning of the second frame, and wherein the second frame is subsequent to the first frame.--

This certificate supersedes the Certificate of Correction issued May 14, 2013.

Signed and Sealed this
Eleventh Day of June, 2013

Teresa Stanek Rea
*Acting Director of the United States Patent and Trademark Office*